United States Patent
Shin et al.

(10) Patent No.: US 8,633,405 B2
(45) Date of Patent: Jan. 21, 2014

(54) DISPLAY PANEL AND DISPLAY DEVICE INCLUDING THE SAME

(75) Inventors: Jin-Soo Shin, Cheonan-si (KR); Jin-Yong Park, Gunpo-si (KR); Jun-Hee Son, Cheonan-si (KR); Jung-Hyeon Kim, Hwaseong-si (KR); Se-Ki Park, Suwon-si (KR)

(73) Assignee: Samsung Display Co., Ltd. (KR)

( * ) Notice: Subject to any disclaimer, the term of this patent is extended or adjusted under 35 U.S.C. 154(b) by 531 days.

(21) Appl. No.: 12/573,787

(22) Filed: Oct. 5, 2009

(65) Prior Publication Data

US 2010/0147582 A1   Jun. 17, 2010

(30) Foreign Application Priority Data

Dec. 16, 2008   (KR) .................. 10-2008-0128031

(51) Int. Cl.
*H05K 7/14* (2006.01)
*G06F 1/16* (2006.01)
*H05K 5/00* (2006.01)
*H05K 7/00* (2006.01)
*G02F 1/1333* (2006.01)

(52) U.S. Cl.
USPC .................... 174/535; 361/679.24; 349/58

(58) Field of Classification Search
USPC ............... 174/535; 349/58, 60, 128, 59, 62; 348/794; 361/679.24, 807, 759, 801
See application file for complete search history.

(56) References Cited

U.S. PATENT DOCUMENTS

| | | | |
|---|---|---|---|
| 5,583,681 A * | 12/1996 | Shioya et al. | 349/60 |
| 6,504,587 B1 * | 1/2003 | Morishita et al. | 349/58 |
| 2006/0066769 A1 * | 3/2006 | Minaguchi et al. | 349/58 |
| 2007/0064378 A1 * | 3/2007 | Lo et al. | 361/681 |
| 2007/0195220 A1 * | 8/2007 | Ono | 349/58 |
| 2007/0222917 A1 * | 9/2007 | Ono | 349/65 |
| 2008/0204630 A1 * | 8/2008 | Hsieh et al. | 349/62 |

FOREIGN PATENT DOCUMENTS

JP   2005321614 A  * 11/2005 ............ G02F 1/1333

OTHER PUBLICATIONS

Definition of alternate from www.merriam-webster.com Apr. 15, 2013.*
Lee (JP 2005321614 A) provided in Office Action.*
English Machine Translation of Lee (JP 2005321614 A) provided in Office Action.*

* cited by examiner

*Primary Examiner* — Chau Nguyen
*Assistant Examiner* — Roshn Varghese
(74) *Attorney, Agent, or Firm* — Innovation Counsel LLP (57) ABSTRACT

A display device comprises: a display panel including a first insulating substrate and a second insulating substrate that is arranged so as to deviate from the first insulating substrate; and an intermediate frame, wherein the intermediate frame includes: side walls that are arranged so as to correspond to four side surface of the display panel; a mounting portion which protrudes from the side walls inward and on which the first insulating substrate is mounted; and a supporting protrusion that protrudes from the mounting portion to the second insulating substrate and is arranged below the second insulating substrate and on the side of the first insulating substrate.

11 Claims, 10 Drawing Sheets

DISPLAY PANEL AND DISPLAY DEVICE INCLUDING THE SAME

CROSS-REFERENCE TO RELATED APPLICATION

This application claims priority to Korean Patent Application No. 10-2008-0128031 filed on Dec. 16, 2008 in the Korean Intellectual Property Office, the disclosure of which is incorporated herein by reference in its entirety.

BACKGROUND OF THE INVENTION

1. Field of the Invention

The present disclosure relates generally to flat panel displays. More specifically, the present disclosure relates to flat panel displays.

2. Description of the Related Art

With improvement in information technology has come an increasing demand for display devices having a large screen size but a small thickness. Demand has thus increased for various types of flat display devices, such as PDP (plasma display panel), PALC (plasma-addressed liquid crystal display panel), LCD (liquid crystal display), and OLED (organic light emitting diode) devices.

In particular, the flat display devices have seen wide acceptance in the computer industry, the electronics industry, and the communications industry, due to their relatively low power consumption, light weight, and small size. The flat display device commonly includes: a liquid crystal panel assembly having a liquid crystal panel that displays image information; a backlight assembly having a lamp that emits light and a light guide plate that guides light to the liquid crystal panel; and a housing that accommodates the liquid crystal panel assembly and the backlight assembly.

The display panel is typically formed by bonding two display plates so as to face each other. The display panel is formed of a mother substrate. That is, the mother substrate may be cut into desired sizes for the display panel. Therefore, in order to effectively use the mother substrate, it is preferable to remove an unnecessary region of the display panel Accordingly, it is desirable to develop frame structures capable of stably accommodating a display panel including insulating substrates that are arranged so as to deviate from each other.

SUMMARY OF THE INVENTION

Aspects of the present invention provide a display device having a structure capable of stably accommodating a display panel including insulating substrates that are arranged with an offset from each other, without damaging the display panel.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a display device comprising: a display panel including a first insulating substrate and a second insulating substrate offset from the first insulating substrate, and an intermediate frame. The intermediate frame includes side walls arranged so as to correspond to four side surfaces of the display panel, a mounting portion protruding from the side walls inward and having the first insulating substrate mounted thereon, and a supporting protrusion extending from the mounting portion approximately to the second insulating substrate. The supporting protrusion is arranged below the second insulating substrate and proximate to the first insulating substrate.

According to another aspect of the present invention, there is provided a display panel comprising: a first insulating substrate, and a second insulating substrate arranged such that at least two sides of the second insulating substrate are offset from corresponding sides of the first insulating substrate.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EXEMPLARY EMBODIMENTS

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Spatially relative terms, such as "below," "beneath," "lower," "above," "upper," and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures.

Figure 1:
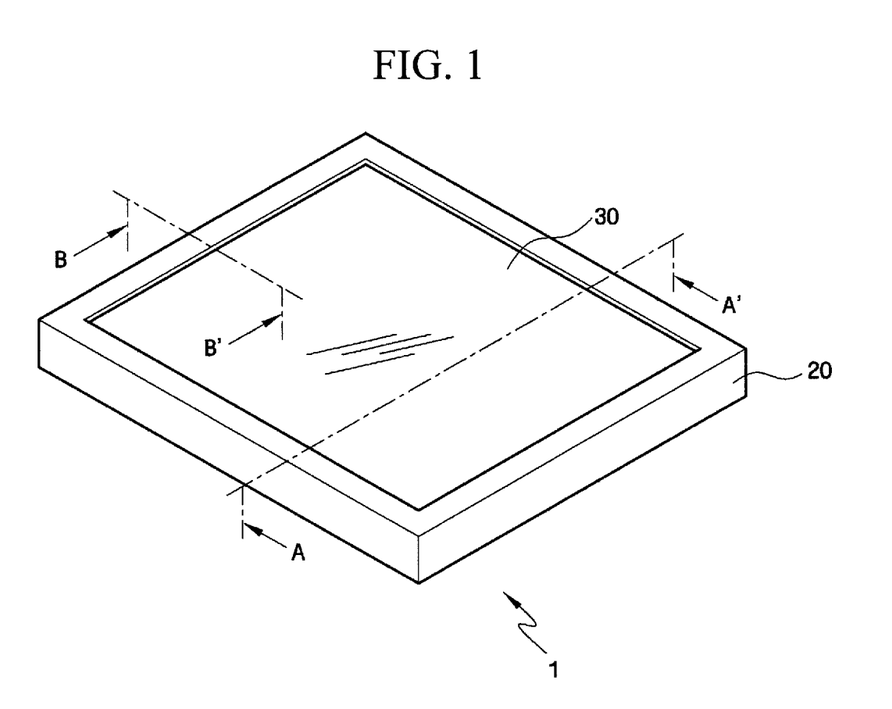
FIG. 1 is a perspective view illustrating a display device according to a first embodiment of the present invention.
Figure 2:
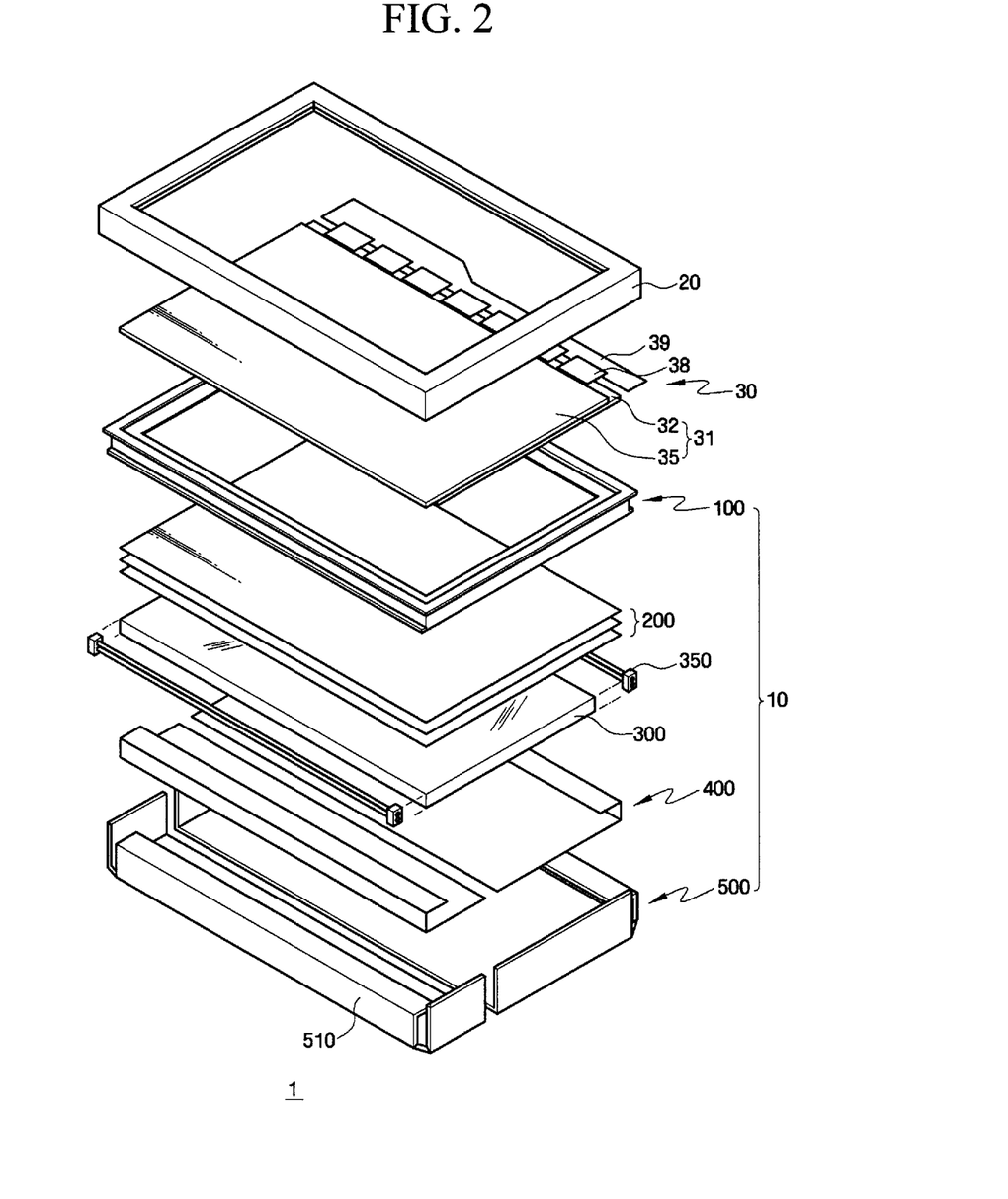
FIG. 2 is an exploded perspective view illustrating the display device shown in FIG. 1.
Figure 3:
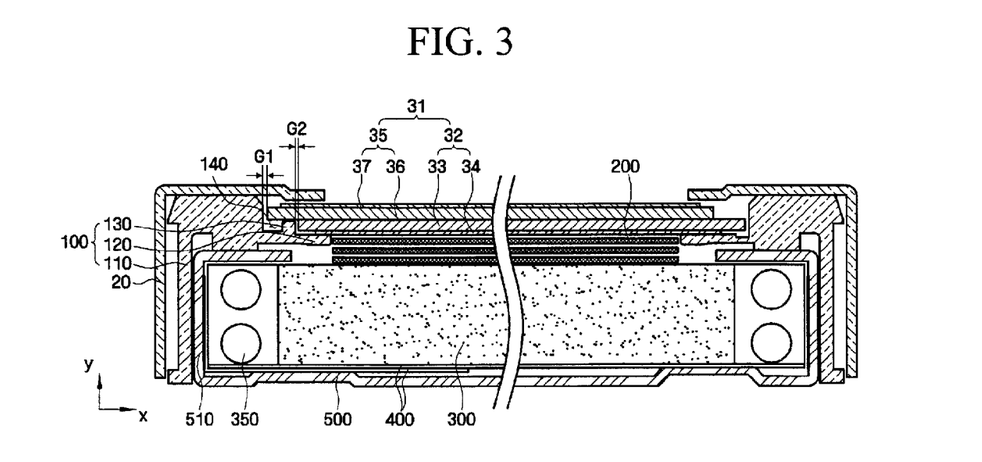
FIG. 3 is a cross-sectional view illustrating the display device taken along the line A-A' of FIG. 1.
Figure 4A:
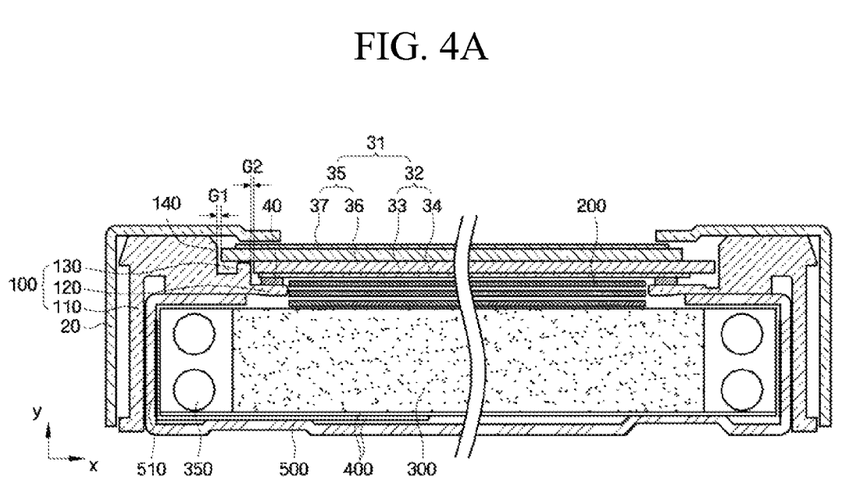
FIGS. 4A and 4B are diagrams illustrating modifications of the display device shown in FIG. 3.
Figure 4B:
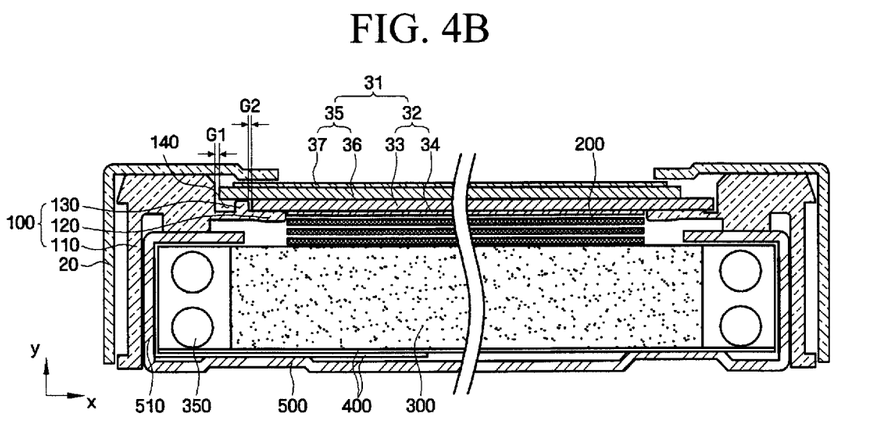
Figure 5:
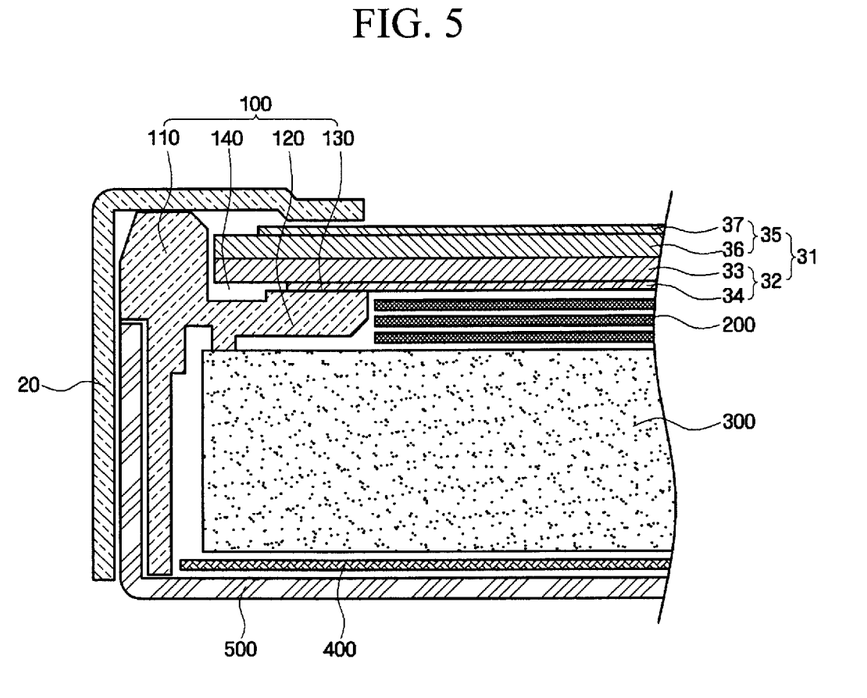
FIG. 5 is a cross-sectional view illustrating the display device taken along the line B-B' of FIG. 1.
Figure 6:
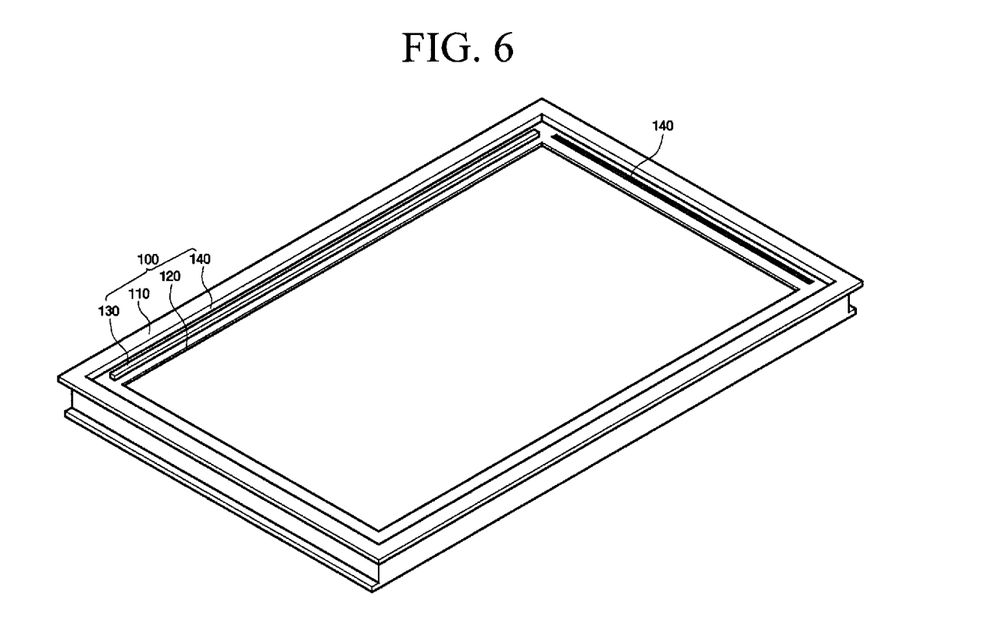
FIG. 6 is a perspective view illustrating an intermediate frame of the display device shown in FIG. 1.

Hereinafter, a display device according to a first embodiment of the present invention will be described in detail with reference to FIGS. 1 to 6. FIG. 1 is a perspective view illustrating the display device according to the first embodiment of the present invention. FIG. 2 is an exploded perspective view illustrating the display device shown in FIG. 1. FIG. 3 is a cross-sectional view illustrating the display device taken along the line A-A' of FIG. 1. FIGS. 4A and 4B are diagrams illustrating modifications of the display device shown in FIG. 3. FIG. 5 is a cross-sectional view illustrating the display device taken along the line B-B' of FIG. 1. FIG. 6 is a perspective view illustrating an intermediate frame included in the display device shown in FIG. 1.

First, referring to FIGS. 1 and 2, a display device 1 according to the first embodiment of the present invention includes a display panel assembly 30, an upper housing 20, and a backlight assembly 10.

The display panel assembly 30 includes a display panel 31 having a lower display panel 32 and an upper display panel 35, liquid crystal (not shown) injected between the lower display panel 32 and upper display panel 35, a flexible film 38, and a printed circuit board 39.

The display panel 31 positions the lower display panel 32 facing the upper display panel 35. The lower display panel 32 includes, for example, gate lines (not shown), data lines (not shown), a thin film transistor array, and pixel electrodes, and the upper display panel 35 includes, for example, a color filter, a black matrix, and a common electrode. For example, the color filter and the common electrode may be formed on the lower display panel 32.

The flexible film 38 is connected to the gate lines (not shown) and the data lines (not shown) formed on the lower display panel 32. The flexible film 38 may include a driving IC (not shown) capable of supplying driving signals to the gate lines and the data lines.

Various driving parts that can input various signals for outputting driving signals to the driving IC are mounted on the printed circuit board 39.

The upper housing 20 forms the outward appearance of the display device 1, and has a space for accommodating the display panel assembly 30. A window that exposes the display panel 31 to the outside is formed at the center of the upper housing 20, and the upper housing 20 is coupled to the lower housing 500 with an intermediate frame 100 interposed therebetween.

The backlight assembly 10 includes, for example, the intermediate frame 100, an optical sheet 200, a light guide plate 300, a lamp 350, a reflecting sheet 400, and the lower housing 500.

The lamp 350 includes one or more light sources that emit light. In this embodiment, lamp 350 can be any suitable illumination source, for example: a linear light source, such as a cold cathode fluorescent lamp (CCFL), a hot cathode fluorescent lamp (HCFL), or an external electrode fluorescent lamp (EEFL); and/or a point light source, such as a light emitting diode (LED). As shown in FIG. 2, in the case of an edge-type backlight assembly, one or more lamps 350 may be provided on the side surface of the light guide plate 300. That is, the lamps may be formed on one side surface of the light guide plate 300, or they may be formed on both side surfaces of the light guide plate 300, if necessary.

The light guide plate 300 guides light emitted from the lamp 350 to the display panel assembly 30. The light guide plate 300 is formed of a plastic-based transparent material, such as acryl, and guides light emitted from the light source to the display panel 31 that is provided above the light guide plate 300. Therefore, various patterns that change the traveling direction of light incident into the light guide plate 300 to the display panel 31 are printed on the bottom of the light guide plate 300.

The optical sheet 200 is provided above the light guide plate 300 and diffuses and condenses light emitted from the light guide plate 300. The optical sheet 200 may include at least one of a diffusion sheet, a prism sheet, and a protective sheet. The optical sheet 200 may also take the form of a complex sheet that can perform all the functions of the diffusion sheet, the prism sheet, and the protective sheet. That is, a lower part of the optical sheet 200 may have a diffusion function, and a prism pattern (not shown) may be formed on an upper part of the optical sheet 200. In addition, a protective layer (not shown) may be formed on the prism pattern. As such, since the optical sheet 200 has both the diffusion function and the prism function, it is possible to reduce the number of components, and thus reduce the size of the display device 1.

The lower housing 500 is coupled to a lower part of the intermediate frame 100. The lower housing 500 can be divided into two portions, as shown. The two portions can be coupled to each other and the intermediate frame 100 in any manner. Collectively, the two coupled portions can accommodate the light guide plate 300, the optical sheet 200, and the lamp 350. The lower housing 500 may be formed from a metal plate by, for example, sheet metal processing.

The lower housing 500 includes a lamp cover 510 and side walls formed by bending a portion of the bottom.

The lamp cover 510 is formed by bending one end of the lower housing 500, and forms a space for accommodating the lamp 350. In edge-type display devices, the lamp 350 is provided on the side of the light guide plate 300, and the lamp cover 510 may be formed in the lower housing 500 outside the lamp 350.

The lamp cover 510 may be formed in either portion of the lower housing 500. In this case, the lamp cover 510 is formed on one side wall of the lower housing 500.

The reflecting sheet 400 is provided below the light guide plate 300 and reflects light emitted from the lower surface of the light guide plate 300 back upward, through the light guide plate 300. More specifically, the reflecting sheet 400 reflects light that is not reflected from a fine dot pattern formed on the lower surface of the light guide plate 300, back up through an emission surface of the light guide plate 300. In this way, the reflecting sheet 400 reduces the loss of light incident on the display panel 31 and improves the uniformity of light emitted from the emission surface of the light guide plate 300. The reflecting sheet 400 may be inserted as a separate reflecting sheet. Alternatively, the reflecting sheet 400 may be a reflecting pattern formed by applying a high reflectance material onto the lower housing 500, instead of the separate reflecting sheet. The reflecting sheet 400 may be divided and inserted along the divided lower housing 500. That is, the reflecting sheet 400 may be divided so as to correspond to the shapes of the two portions of lower housing 500, and the divided reflecting sheets may be inserted along each housing portion.

The reflecting sheet 400 may extend into the lamp cover 510 in order to effectively reflect light emitted from the lamp 350. One end of the reflecting sheet 400 disposed inside the lamp cover 510 may be bent in a U shape, similar to the lamp cover 510.

Next, the structures of the display panel 31 and the intermediate frame 100 will be described in detail with reference to FIGS. 2 to 5.

Referring to FIGS. 2 and 3, in the display panel 31, the upper display panel 35 and the lower display panel 32 are arranged so as to be offset from each other in one direction.

The lower display panel 32 includes, for example, first insulating substrate 33 and the thin film transistor array and pixel electrodes formed thereon. The upper display panel 35 includes a second insulating substrate 36 that is arranged opposite to the first insulating substrate 33.

The lower display panel 32 and the upper display panel 35 include polarizing films 34 and 37 that are provided outside the first insulating substrate 33 and the second insulating substrate 36, respectively.

The first insulating substrate 33 and the second insulating substrate 36 may be made of, for example, glass, and may be formed by dividing a large mother substrate. That is, the mother substrate is formed of a size sufficient to allow both the first insulating substrate 33 and the second insulating substrate 36 to be cut out. This allows for improved manufacturing efficiency. This mother substrate is then cut into the first insulating substrate 33 and the second insulating substrate 36. In this case, the usage efficiency of the mother substrate depends on the sizes and shapes of the first insulating substrate 33 and the second insulating substrate 36.

Unnecessary regions may be removed from the first insulating substrate 33 and the second insulating substrate 36, and the first insulating substrate 33 and the second insulating substrate 36 may be cut in the same size in order to simplify manufacturing. In this case, the first insulating substrate 33 and the second insulating substrate 36 are arranged so as to be somewhat offset from each other.

The first insulating substrate 33 needs to have a space for mounting the flexible film 38 that supplies driving signals to the gate lines and the data lines. Therefore, the first insulating substrate 33 and the second insulating substrate 36 do not completely overlap each other, but instead are offset from each other such that one surface of the first insulating substrate 33 is partially exposed.

In this case, the first insulating substrate 33 and the second insulating substrate 36 may be offset from each other in one direction or two directions. The offsets may be in the direction in which the gate lines extend, and in the direction in which the data lines extend. The invention encompasses embodiments in which the substrates 33, 36 are offset from each other in one of these directions, and in both directions simultaneously.

When the first insulating substrate 33 and the second insulating substrate 36 are offset from each other in two directions, all four sides of the first insulating substrate 33 and the second insulating substrate 36 are set apart from each other. When the substrates 33, 36 are offset from each other in a single direction, the offset can be along any two opposing sides, i.e. the substrates 33, 36 can be placed together so that their longer sides are offset from each other, or so that their shorter sides are offset from each other.

The flexible film 38 may be mounted to a portion of the first insulating substrate 33 that is exposed by the offset. The flexible film 38 has a driving IC mounted thereon, and may supply a gate signal and a data signal.

The display panel 31 is mounted to the intermediate frame 100. The intermediate frame 100 includes four side walls 110 that are arranged along four sides of the display panel 31, and mounting portions 120 that protrude from the side walls 110 inward. The mounting portions 120 are formed along the four side walls 110, and the mounting portions 120 and the side walls 110 may be formed of a mold.

Referring to FIGS. 3 and 6, the first insulating substrate 33 is mounted on the mounting portions 120. The first insulating substrate 33 may be directly mounted on the upper surfaces of the mounting portions 120, or it may be mounted to the mounting portions 120 with the polarizing film 34 interposed therebetween. That is, the mounting portions 120 would support the first insulating substrate 33.

A supporting protrusion 130 protrudes from the upper surface of the mounting portion 120 to the second insulating substrate 36. In this embodiment, the intermediate frame 100 has four mounting portions 120, one along each side of frame 100 as shown, and the supporting protrusion 130 is disposed on one of these mounting portions 120. The mounting portion 120 with the supporting protrusion 130 is disposed below the portion of the second insulating substrate 36 that protrudes from the first insulating substrate 33. The supporting protrusion 130 helps hold the substrates 33, 36 in place, for more stable mounting.

Specifically, since the first insulating substrate 33 and the second insulating substrate 36 are offset from each other, the support structure of the intermediate frame 100 needs to support both substrates. If a support structure supports only the outermost side of the display panel 31 as in the related art, an impact is applied to only one of the two substrates 33, 36, which may cause the first insulating substrate 33 to be separated from the second insulating substrate 36. However, in this embodiment, the supporting protrusion 130 can better disperse the impact applied to the first insulating substrate 33 and the second insulating substrate 36.

The supporting protrusion 130 may have a height corresponding to first insulating substrate 33. That is, the supporting protrusion 130 of this embodiment does not extend above first insulating substrate 33.

The supporting protrusion 130 is thus disposed along the side of the first insulating substrate 33. The supporting protrusion 130 supports the second insulating substrate 36 when pressure is applied to the display panel 31 in a y-axis direction, and supports the first insulating substrate 33 when pressure is applied to the display panel 31 in an x-axis direction. The supporting protrusion 130 may continuously extend along the mounting portion 120.

A first gap G1 is formed between the side wall 110 and the second insulating substrate 36, and a second gap G2 is formed between the supporting protrusion 130 and the first insulating substrate 33. The first gap G1 and the second gap G2 enable the display panel 31 to be moved within the intermediate frame 100. These gaps may accommodate, for example, expansion of display panel 31 or intermediate frame 100 due to temperature, or external impacts applied to display panel 31.

The first gap G1 may be greater than the second gap G2. For example, the first gap G1 may be equal to or less than about 0.3 mm, and the second gap G2 may be in the range of about 0.1 to about 0.4 mm.

When force is applied to the display panel 31 in the x-axis direction, the display panel 31 first comes into contact with the supporting protrusion 130. That is, the supporting protrusion 130 and the first insulating substrate 33 primarily absorb the impact. If the supporting protrusion 130 is sufficiently deformed, the second insulating substrate 36 comes into contact with the side wall 110 and secondarily absorbs the impact.

If the first gap G1 is less than the second gap G2 and force is applied to the display panel 31 in the x-axis direction, the second insulating substrate 36 first comes into contact with the side wall 110. This transmits force from the side wall 110 to the second insulating substrate 36, which may damage a seal line (not shown), i.e. a bonding portion between the first insulating substrate 33 and the second insulating substrate 36.

Since the elasticity of the side wall 110 is less than that of the supporting protrusion 130, the display panel 31 may be damaged, when force is first applied from the side wall 110 to the display panel 31.

Each of the mounting portions 120 of the intermediate frame 100 includes a concave groove 140 that is adjacent to the side wall 110 and is formed along the edge of the display panel 31. The concave grooves 140 are disposed inside the four side walls 110 of the intermediate frame 100 along the mounting portions 120, and help prevent the entrance of foreign materials into the display panel 31 from the outside. The concave grooves 140 may be formed in the four mounting portions 120 along the side walls 110, and may be at least partially formed by one or more of the protrusions 130a, 130b. The depths and widths of the concave grooves 140 formed along the mounting portions 120 may vary, and may be different from each other.

Referring to FIG. 4A, an adhesive member may be provided between the polarizing film 34 and the mounting portion 120 of the display panel 31. An adhesive member 40 may fix the display panel 31 to the mounting portions 120, or it may prevent leakage of light emitted from the lamp 350. In addition, the adhesive member 40 may serve as a buffer member between the display panel 31 and the mounting portion 120, so as to help prevent damage to the display panel 31.

Referring to FIG. 4B, the first insulating substrate 32 of the display panel 31 may be directly mounted to the mounting portions 120. When the first insulating substrate 32 is directly mounted to the mounting portions 120, it is possible to reduce the thickness of a display device.

Referring to FIG. 5, at the short sides of the display panel 31, the side of the first insulating substrate 33 is aligned with the side of the second insulating substrate 36. The first insulating substrate 33 and the second insulating substrate 36 are arranged such that their sides are aligned with each other and a predetermined gap is formed between the sides of the insulating substrates and the side walls 110 of the intermediate frame 100.

When sufficient force is applied to the side of the display panel 31, the first insulating substrate 33 and the second insulating substrate 36 both simultaneously collide with the side wall 110. In this configuration, the first insulating substrate 33 and the second insulating substrate 36 are less likely to be separated from each other, and the display panel 31 is less likely to be damaged.

Referring to FIG. 2 again, the intermediate frame 100 is coupled to the lower housing 500. The two shorter side walls of the intermediate frame 100 are disposed inside the lower housing 500, while the two longer sides are disposed outside of the lower housing 500.

The lower housing 500 includes a lamp cover 510 that accommodates the lamp 350. The lamp cover 510 may be formed by bending an extending portion of the bottom of the lower housing.

Figure 7:
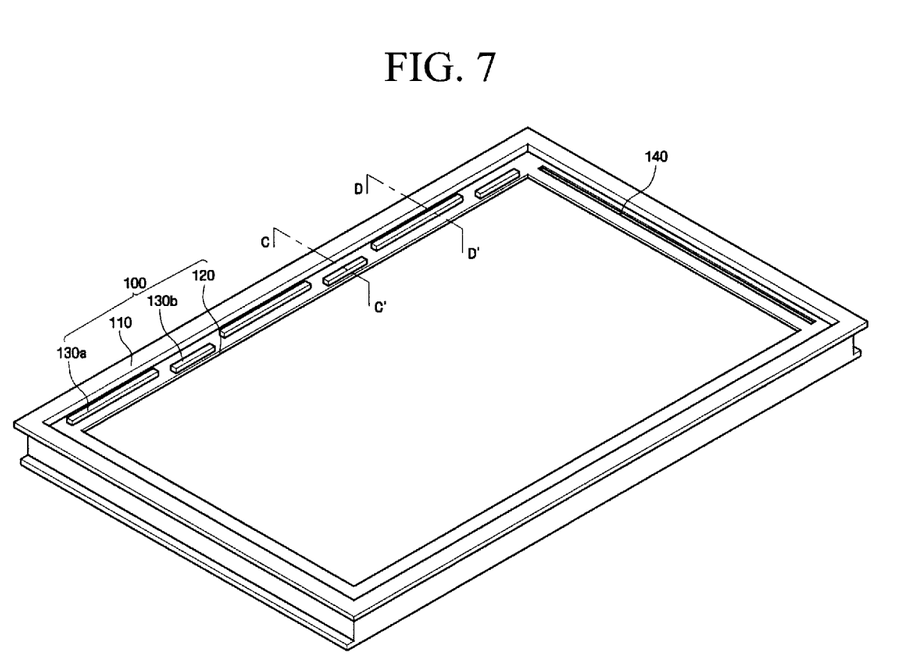
FIG. 7 is a perspective view illustrating an intermediate frame of a display device according to a second embodiment of the present invention.
Figure 8A:
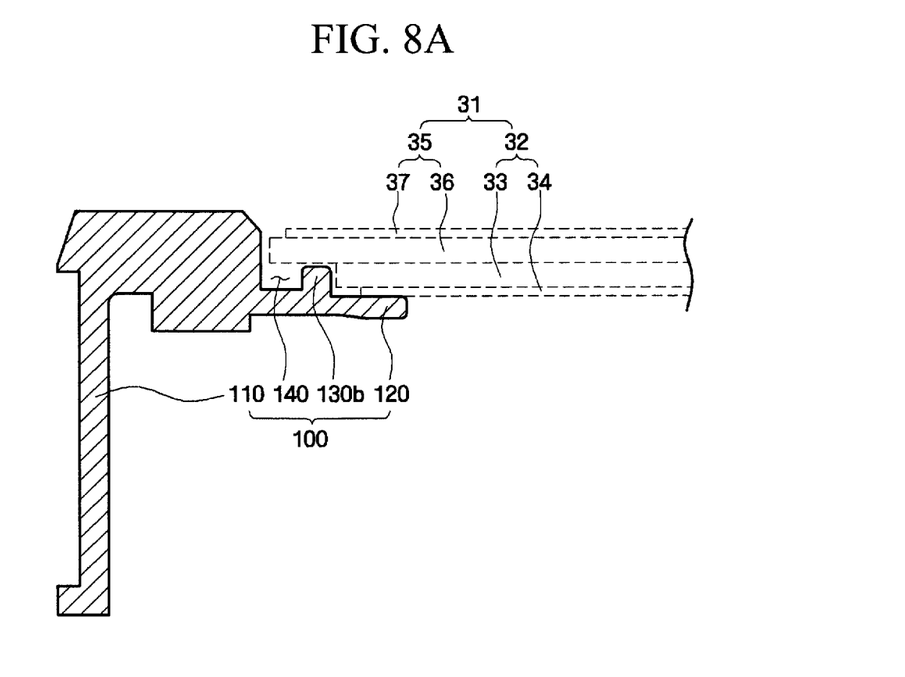
FIG. 8A is a cross-sectional view illustrating the intermediate frame taken along the line C-C' of FIG. 7.
Figure 8B:
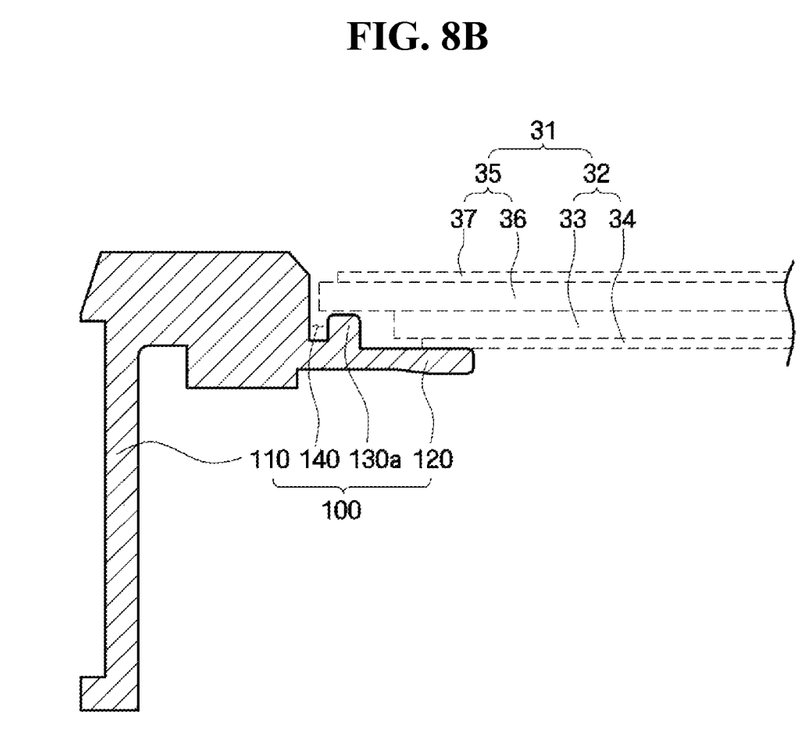
FIG. 8B is a cross-sectional view illustrating the intermediate frame taken along the line D-D' of FIG. 7.

Next, a display device according to a second embodiment of the present invention will be described in detail with reference to FIGS. 7 to 8B. FIG. 7 is a perspective view illustrating an intermediate frame of the display device according to the second embodiment of the present invention. FIG. 8A is a cross-sectional view illustrating the intermediate frame taken along the line C-C' of FIG. 7, and FIG. 8B is a cross-sectional view illustrating the intermediate frame taken along the line D-D' of FIG. 7. For clarity of description, in this embodiment, the same components as those in the first embodiment are denoted by the same reference numerals, and a description thereof will be omitted.

A display device 1 according to the second embodiment of the present invention includes an intermediate frame 100 in which supporting protrusions intermittently extend along the mounting portion 120.

The intermediate frame 100 includes side walls 110 that are provided along four side surfaces of the display panel 31, and mounting portions 120 that protrude from the side walls 110 inward.

First supporting protrusions 130a and second supporting protrusions 130b are formed on the upper surface of the mounting portion 120. The first supporting protrusions 130a and the second supporting protrusions 130b protrude from the upper surface of the mounting portion 120 to the second insulating substrate 36. The first supporting protrusions 130a and the second supporting protrusions 130b may be provided on one of the four mounting portions 120, positioned below the offset portion of the second insulating substrate 36. The first supporting protrusions 130a and the second supporting protrusions 130b may be formed intermittently along the mounting portion 120. That is, the first supporting protrusions 130a and the second supporting protrusions 130b are spaced apart from each other along the mounting portion 120.

In this case, the first supporting protrusions 130a and the second supporting protrusions 130b may be provided such that the gap between the first supporting protrusion 130a and the first insulating substrate 33 is different from the gap between the second supporting protrusion 130b and the first insulating substrate 33. That is, the distance between the first supporting protrusion 130a and the side wall 110 may be different from that between the second supporting protrusion 130b and the side wall 110.

When the first supporting protrusions 130a and the second supporting protrusions 130b extend intermittently along the mounting portion 120, it is easier to maintain the gaps between the first insulating substrate 33 and the first and second supporting protrusions 130a, 130b. It is more difficult to continuously maintain minute gaps between the first insulating substrate 33 and the first and second supporting protrusions 130a and 130b when those protrusions 130a, 130b are formed as long, continuous protrusions.

Figure 9:
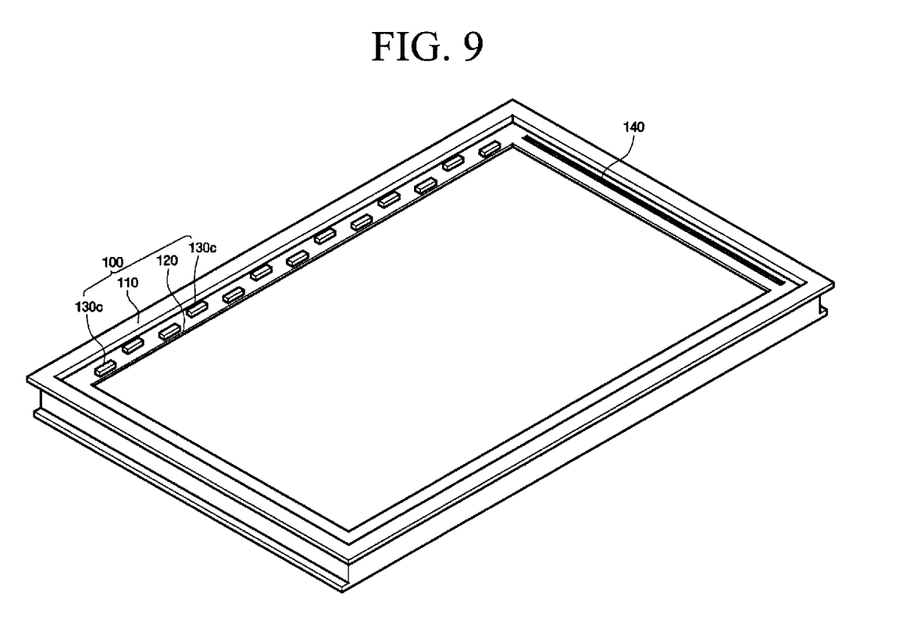
FIG. 9 is a perspective view illustrating an intermediate frame of a display device according to a third embodiment of the present invention.

Next, a display device according to a third embodiment of the present invention will be described in detail with reference to FIG. 9. FIG. 9 is a perspective view illustrating an intermediate frame of the display device according to the third embodiment of the present invention. For clarity of description, in this embodiment, the same components as those in the second embodiment are denoted by the same reference numerals, and a description thereof will be omitted.

The display device according to the third embodiment of the present invention is a modification of the second embodiment. In this embodiment, first supporting protrusions 130c and second supporting protrusions 130d are formed in alternating fashion along the mounting portion 120. Since the first supporting protrusions 130c and the second supporting protrusions 130d each have relatively short lengths, each is more likely to be formed in its correct position, compared to a long, continuous protrusion that is more susceptible to variations in the fabrication process. Accordingly, an impart or load applied to a display panel (see reference numeral 31 of FIG. 2) is more effectively dispersed by the first supporting protrusions 130c or the second supporting protrusions 130d.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A display device comprising:
   a display panel including a first insulating substrate and a second insulating substrate positioned on the first insulating substrate and being offset from the first insulating substrate;

a lower housing; and an intermediate frame disposed between the display panel and the lower housing, the intermediate frame coupled to the lower housing, wherein the intermediate frame includes:

side walls arranged so as to correspond to four side surfaces of the display panel;

a mounting portion protruding inward from the side walls and having the first insulating substrate mounted thereon;

a supporting protrusion extending from the mounting portion to a position proximate to the second insulating substrate, the supporting protrusion arranged below the second insulating substrate;

a protrusion extending from the mounting portion to an upper housing; and a concave groove disposed between the supporting protrusion and the protrusion, the concave groove being recessed from an upper surface of the supporting protrusion.

2. The display device of claim 1, wherein the supporting protrusion extends in continuous manner along the mounting portion.

3. The display device of claim 1, wherein a plurality of the supporting protrusions are spaced apart from each other along the mounting portion.

4. The display device of claim 3, wherein the supporting protrusion includes first supporting protrusion and second supporting protrusion, and wherein a first gap formed between the first supporting protrusion and the first insulating substrate is smaller than a second gap formed between the second supporting protrusion and the first insulating substrate.

5. The display device of claim 4, wherein the first supporting protrusion and the second supporting protrusion are placed in alternating manner along the mounting portion.

6. The display device of claim 4, wherein a distance between the first support protrusion and the protrusion is different from a distance between the second support protrusion and the protrusion.

7. The display device of claim 4, wherein both of the first supporting protrusion and the second protrusion are arranged below the second insulating substrate.

8. The display device of claim 4, wherein a height of the first support protrusion from the mounting portion and a height of the second support protrusion from the mounting portion are substantially the same.

9. The display device of claim 1, further comprising:

an adhesive member provided between the first insulating substrate and the mounting portion.

10. The display device of claim 1 wherein:

the second insulating substrate is spaced apart from the protrusion by a first gap, and the supporting protrusion is spaced apart from the first insulating substrate by a second gap, wherein the first gap is larger than the second gap.

11. The display device of claim 10, wherein the first gap is equal to or less than approximately 0.3 mm and wherein the second gap is between approximately 0.1 and approximately 0.4 mm.

* * * * *